United States Patent [19]

Okamura et al.

[11] Patent Number: 5,068,301

[45] Date of Patent: Nov. 26, 1991

[54] COATING COMPOSITION FOR ELECTROPHOTOGRAPHIC CARRIER

[75] Inventors: Yoshio Okamura; Mitsuhiro Takarada; Yoshiteru Kobayashi; Tadashi Takahashi, all of Annaka, Japan

[73] Assignee: Shin-Etsu Chemical Co., Ltd., Tokyo, Japan

[21] Appl. No.: 404,544

[22] Filed: Sep. 8, 1989

[30] Foreign Application Priority Data

Sep. 9, 1988 [JP] Japan .................. 63-226270

[51] Int. Cl.$^5$ .......................... C08G 77/06
[52] U.S. Cl. ........................... 528/15; 528/16; 528/17; 528/18; 528/19; 528/38; 528/31
[58] Field of Search ................ 528/31, 15, 16, 17, 528/18, 19, 38

[56] References Cited

U.S. PATENT DOCUMENTS

| | | | |
|---|---|---|---|
| 4,162,356 | 7/1979 | Grenoble | 528/31 |
| 4,569,980 | 2/1986 | Sasaki | 528/31 |
| 4,624,900 | 11/1986 | Fau | 528/31 |
| 4,719,243 | 1/1988 | Pocknell | 528/31 |
| 4,840,974 | 6/1989 | Gross et al. | 528/31 |
| 4,849,564 | 7/1989 | Shimizu et al. | 528/31 |

*Primary Examiner*—Melvyn I. Marquis
*Attorney, Agent, or Firm*—Millen, White & Zelano

[57] ABSTRACT

A coating composition to form a coat on the surface of electrophotographic carrier which imparts excellent durability, moisture resistance and flowability to the carrier comprises:

(A) 100 parts by weight of an organopolysiloxane of the general formula;

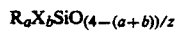

$$R_a X_b SiO_{(4-(a+b))/z}$$

wherein R represents a substituted or unsubstituted hydrocarbon residue; X represents a hydroxyl group, or a hydrolizable group; "a" is a number in the range of $0.8 < a < 1.8$; and "b" is a number in the range of $0.1 < b \leq 3$, (B) 0.05 to 50 parts by weight of an organohydrogenpolysiloxane having at least two hydrogen atoms bonded directly to silicon atom, in a molecule, and (C) a curing catalyst.

9 Claims, No Drawings

COATING COMPOSITION FOR ELECTROPHOTOGRAPHIC CARRIER

FIELD OF THE INVENTION

This invention relates to a coating composition for forming the surface coat of a carrier to be used in a two-component developer for a dry processable copying machine. More particularly, it is concerned with a silicone composition to be coated onto a carrier surface for the purpose of preparing a carrier which is excellent in durability, moisture resistance and flowability.

BACKGROUND OF THE INVENTION

A two-component developer for a dry processable copying machine, as is well-known, comprises two components, viz., a finely divided toner and a carrier which is larger than the toner in particle size. When mixed and agitated, both components are statically electrified by rubbing, and charges are gained which are opposite in sign to each other. The thus electrified toner is made to adhere electrostatically to an electrostatic latent image formed on a photoreceptor, resulting in the formation of a visible image. This visible image is then transferred and fixed onto a transfer sheet, thus achieving duplication.

In the process as described above, oxidized or unoxidized iron powder has generally been used as the carrier. However, a carrier of this kind has defects, viz., the triboelectrification characteristics thereof is not satisfactory with respect to the toner, and what is worse, it changes with the lapse of time since strong adhesion of the toner to the carrier surface occurs with repeated use and forms a toner film thereon, resulting in the shortening of the developer's life span (so-called spent phenomenon). In addition, there is a large difference in electrification characteristics between carrier in a dry and in a humid atmosphere. More specifically, there exists such a problem that even if carriers exhibit excellent characteristics in Japan, they cannot display their abilities to the fullest in high temperature-high humidity places (e.g., Southeast Asia) whereto they have been exported.

With the intention of obviating the above-described defects, it has been proposed to coat on carrier surface a resin having low surface energy, such as a fluorine-containing resin or a silicone resin, (e.g., in Japanese Patent Kokai Nos. 54-21730 and 58-40557 (The term "Japanese Patent Kokai" as used herein means as "unexamined published Japanese patent application"), Japanese Patent Kokoku Nos. 59-131944 and 59-26945 (The term "Japanese Patent Kokoku" as used herein means an "examined Japanese patent publication"), etc.).

In particular, silicone resins can have various molecular structures depending on the constituent monomers selected for their synthesis, so they not only can be used for the production of carriers which have a wide variety of charge acceptance levels, but they also have many advantages from the working point of view, e.g., that they can be dissolved in various solvents, uniformly coated on the carrier surface with ease, set at relatively low temperatures, and so on.

On the other hand, silicone resins have a defect in that their mechanical strength is generally low, so they come off due to abrasion and generate cracks due to peeling-off after long hours of use, which results in a loss of their excellent characteristics, and a corresponding lowering of copying ability. Thus, silicone resins are not satisfactory with respect to lifespan upon long-term use.

One of the two components which constitute a developer, as the toner is consumed, new toner is supplied in a supplemental amount. On the other hand, a carrier is used continuously. However, it is impossible to restore a carrier's ability which has deteriorated due to continuous use. Therefore, the developer as a whole must be renewed when the carrier has undergone deterioration.

In recent years, requirements for carriers have become more stringent due to popularization of high-speed copying machines and the number of copies needed becomes larger and larger. Therefore, a treatment with conventional silicone resins cannot cope with the present situation.

In addition, the renewal of developer is disadvantageous in cost, as well as being bothersome. Under these circumstances, it was an objective to develop novel carrier-treating agents in high durability.

SUMMARY OF THE INVENTION

As a result of examining various silicone compositions as the surface coat of carriers, it has now been found that remarkably favorable results, that is, both with respect to retention of the merits of silicone resins and attainment of long life and high stability, can be effected by selecting a combination of certain organopolysiloxanes and organohydrogenpolysiloxanes, adding thereto a setting catalyst, coating the resulting composition on a carrier surface, and then setting the coated composition, thus achieving this invention.

Therefore, a first object of this invention is to provide a coating composition useful as the surface coat of electrophotographic carrier which enables prolongation of a developer's life by suppression of the before-mentioned spent phenomenon.

A second object of this invention is to provide a coating composition for surface coating an electrophotographic carrier which can prevent the electrification characteristics of the carrier from being adversely affected by the temperature of the atmosphere.

In a composition aspect, this invention is a coating composition for an electrophotographic carrier, which comprises components (A), (B) and (C):

(A) 100 parts by weight of a compound represented by the general formula (I);

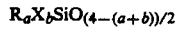

(wherein R represents a substituted or unsubstituted hydrocarbon residue; X represents a hydroxyl group or a hydrolyzable group; "a" is a number in the range of $0.8 < a < 1.8$; and "b" is a number in the range of $0.01 < b \leq 3$), (B) 0.05 to 50 parts by weight of an organohydrogenpolysiloxane having at least two hydrogen atoms bonded directly to a silicon atom, and (C) a curing catalyst for (A) and (B).

DETAILED DESCRIPTION OF THE INVENTION

Each component used in the composition of this invention is described in detail below.

The component (A) of the composition of this invention is a compound represented by the general formula,

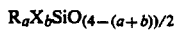

In the above formula, R is a group selected from among unsubstituted hydrocarbon residues including alkyl groups containing 1 to 6 carbon atoms, alkenyl groups such as vinyl group, allyl group, etc., and phenyl group, or substituted hydrocarbon residues including 3,3,3-trifluoropropyl group, tolyl group, xylyl group, benzyl group, chloroalkyl groups, p-chrorophenyl group, cyanoethyl group and so on. Among these groups, alkyl groups containing 1 to 4 carbon atoms, phenyl group and vinyl group are preferred in respect of availability. X is OH (silanol) group and/or a group selected from among hydrolyzable groups. Specific examples of hydrolyzable groups include alkoxy groups containing 1 to 4 carbon atoms, alkenoxy groups, acetoxy groups, aminoxy groups, oxime groups, halogen atoms, and the like. These groups each participates in curing after having once been converted to SiOH (silanol) by moisture adsorbed on the carrier surface in the course of a coating procedure or upon contact with humid air.

"a" in the general formula (1) can be a value in the range of 0.8 to 1.8. When "a" is below 0.8, the surface coat obtained is rigid and brittle, and tends to come off due to generation of cracks during the use, while when "a" is above 1.8 the resin formed readily causes thermal softening, so release of toner under high temperatures becomes difficult to effect smoothly. The most preferable range of "a" is from 1.0 to 1.5.

On the other hand, "b" in the general formula (1) can be a value in the range of 0.01 to 3.

When "b" is below 0.01, sufficient adhesiveness to the carrier surface cannot be obtained even though a surface coat thereof on the carrier can be formed. On the other hand, "b" can be up to a value of 3 so long as the surface coat is formed under such a condition that sufficient moisture can be supplied in the setting step. However, the most appropriate range of "b" is from 0.03 to 1.0.

An organohydrogenpolysiloxane to be used as the component (B) in this invention is an important component which is indispensable for enhancement of durability, and it is necessary for the organohydrogenpolysiloxane to have two or more of hydrogen atoms directly bonded to silicon atom(s) in a molecule.

As specific examples of the component (B), mention may be made of those represented by the following general formulae (2), (3) and (4). However, the component (B) should not be construed as being limited to these compounds.

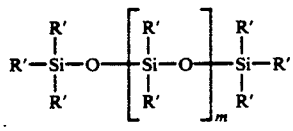

(2)

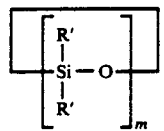

(3)

R'$_c$SiO$_{(4-c)/2}$     (4)

wherein the R's are the same kind, or two or more different kinds of groups selected from among hydrogen atom, alkyl groups, allyl groups, hydroxyl group and hydrolyzable groups, with the proviso that at least two of the R's are hydrogen atoms; m is a positive integer of 3 or more; and c ranges from 1.5 to 2.0.

Although component (B), can achieve its effects even when added in a small amount, it is preferably used in an amount from 0.05 to 50 parts by weight per 100 parts by weight of the component (A). When the component (B) is used in an amount less than 0.05 part by weight, the effect produced is insufficient. On the other hand, when the amount used is beyond 50 parts by weight, the resulting composition is poor in recoatability, so the use of the component (B) in such amounts is disadvantageous, particularly in forming a thick film through repeated recoating, for the purpose of the acquisition of long-period stability.

Accordingly, a particularly preferred content of the component (B) ranges from 0.1 to 10 parts by weight per 100 parts by weight of the component (A).

The component (C) is a curing catalyst, with specific examples including metal soaps which contain as a metal component Zn, Sn, Fe, Pb, Co, Ni, Al, Zr, and so on, chelate compounds, organic acids such as formic acid, acetic acid and the like, and bases such as amines, etc.

In particular, independent or combined use of organotin compounds, organoiron compounds and amino group-containing silane compounds can produce desirable effects.

Suitable examples of organotin compounds include dibutyltin diacetate, dibutytin dilaurate, dibutyltin dioctoate, stannous oleate, stannous naphthenate, and so on.

Suitable examples of organoiron compounds include iron octylate, iron naphthenate, iron (III) acetylacetonate, and so on.

Amino group-containing silane compounds include amino group-containing alkoxysilanes and partial condensates thereof, and can contribute to enhancement of adhesiveness to carrier surface, heightening of the surface hardness, controlling the quantity of the carrier, and so on.

Specific examples of such silane compounds include γ-aminopropyltrimethoxysilane, γ-aminopropyltriethoxysilane, γ-aminoethyl-aminopropyltrimethoxysilane, methyl-γ-aminopropyldimethoxysilane, methyl-γ-aminoethylaminopropyldimethoxysilane, γ-dimethylaminopropyltrimethoxysilane, γ-anilinopropyltrimethoxysilane, γ-morpholinopropyl-trimethoxysilane, N,N'-bis (3-trimethoxysilyl)ethlenediamine, and partial condensates of these silanes.

Both components (A) and (B) can be cured by nature on individual carrier core particles through some processing without using any catalyst. The reason why the catalysts illustrated as the component (C) should be nevertheless used in this invention is in their abilities to link the component (A) and the component (B) together and, at the same time, to make the silicone composition adhere firmly to individual surfaces of carrier core particles, as well as to function as a curing catalyst for each of the components (A) and (B), whereby the mechanical strength of the silicone coat can be remarkably heightened.

The organohydrogenpolysiloxane which constitutes component (A) and the organohydrogenpolysiloxane which constitutes component (B), which are the essential components of this invention, are both old and well-known in this field, and various methods for preparing them are known.

Examples of carrier core particles usable in this invention are iron powder, and ferrite powder. In addition to these powders, materials for the carrier core particles to be used in this invention can be properly chosen from known materials such as magnetic metals (e.g., nickel, cobalt, etc.), magnetic metal oxides, copper, carborundum, glass beads, silicon dioxide and so on. The diameter of such particles ranges from 30 to 1,000 microns, preferably from 50 to 300 microns.

In this invention, the silicone composition constituted by the above-described ingredients is dissolved in an organic solvent (e.g., hydrocarbon solvents such as toluene, xylene, solvent naphtha, etc., alcohols, esters, ketones, ethers, and so on), if necessary, and then coated on individual carrier core particles using, e.g., a fluidized bed process, a dipping process, a spraying process and so on, followed by drying and curing.

A preferred thickness of the coat is from 0.1 to 20 microns. The same silicone composition can be recoated, if needed. Also, different silicone compositions may be coated in layers, if desired.

Curing of the silicone composition of this invention, though can be achieved at ordinary temperature, is preferably carried out under heating to about 100° C.–250° C., because the heating can stabilize the characteristics of the coat and increase the production speed.

Toner, which is another component of a developer and has to be used in combination with the carrier coated with this silicone composition, does not have any particular limitation in this invention. It can be prepared from dispersions of known various synthetic dyes in a wide variety of materials including natural resins, and resins modified by the combined use of natural and synthetic resins.

The coating composition of this invention has been found to be uniformly coated with ease on individual core particle of electrophotographic carrier, and to impart considerably enhanced durability to the resulting carrier as it is endowed with merits of a silicone composition, such as an ability to prevent a spent phenomenon due to facility in releasing toner, an ability to heighten moisture resistance, an ability to control charging capacity, and so on.

This invention will now be illustrated in more detail by reference to the following examples and comparative examples.

EXAMPLE 1

100 pts. wt. of an organopolysiloxane represented by the average composition formula, $(CH_3)_{1.15}(OH)_{0.2}SiO_{1.325}$, and having an average molecular weight of about 2,500, 5 pts. wt. of an organohydrogenpolysiloxane represented by the formula,

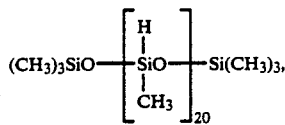

and 420 pts. wt. of solvent naphtha were admixed, and made into a solution. Further, 0.2 pt. wt. of dibutyltin laurate was added thereto, and rendered homogenous by stirring to obtain a silicone composition for a carrier coat.

Then, ferrite having an average particle size of 100 microns was prepared as carrier core particle, and the obtained silicone composition was sprayed thereonto using a fluidized bed apparatus so that silicone coat might amount to 20 g per 1 Kg of the ferrite.

Thereafter, the coat was heated at 200° C. for 60 minutes to set the silicone component.

To a 30 g portion of the thus processed carrier powder, 1.2 g of styrene-carbon black type toner having an average particle size of 12 microns was added, and electrified by vibrating. A quantity of electrification of the toner was measured with a blowoff type electrified powder's electrification measuring apparatus made by Toshiba Chemical K.K..

Further, a 1 Kg portion of the carrier and a 40 g portion of the toner were placed in a forced deterioration device which was made of porcelain and had a volume of 500 ml, and submitted to a forced deterioration test by vigorously vibrating the device in the horizontal direction with an amplitude of 4 cm and a frequency of 370 times per minute.

This forced deterioration test continued for 30 minutes was comparable to copying of about 5,000 sheets in an actual copying machine.

As the result of measurements, a quantity of the initial electrification was 32 $\mu c/g$, expressed in terms of 30 seconds' blowoff value, while the value after the 10 hours' forced deterioration test was 30 $\mu c/g$. That is, there was a slight difference between them.

Thus, the developer of this invention has proved to have excellent durability.

COMPARATIVE EXAMPLE 1

A carrier powder was prepared by processing the same carrier core particles as used in Example 1 under the same condition as in Example 1, except the organohydrogenpolysiloxane used in Example 1 was not employed and the amount of solvent naphtha was changed to 400 pts. wt., and its characteristics were examined. A quantity of the initial electrification was 33 $\mu c/g$, which was almost the same to the value obtained in Example 1. However, the quantity was decreased to 18 $\mu c/g$ after 10 hours' forced deterioration test, and this carrier was clearly unfit for developer in practical use.

COMPARATIVE EXAMPLE 2

A carrier powder was prepared in the same manner as in Example 1, except dibutyltin dilaurate used in Example 1 was not employed. Characteristics of the carrier powder was examined in accordance with the same process as in Example 1. A quantity of the initial electrification was 33 $\mu c/g$, but the quantity was decreased to 9 $\mu c/g$ by the 10 hours' forced deterioration.

Therefore, this carrier powder was also unfit for developer in practical use.

EXAMPLE 2

To 100 pts. wt. of an organopolysiloxane having the average composition formula,

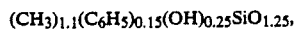

and an average molecular weight of about 2,000 was added 10 pts. wt. of an organohydrogenpolysiloxane having the formula,

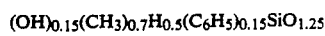

and an average molecular weight of 3,200. Thereto were further added 86 pts. wt. of toluene and 171 pts. wt. of solvent naphtha to make them into a solution. Furthermore, 0.5 pt. wt. of iron octoate was added to the solution, and mixed homogeneously therewith to prepare a silicone composition for carrier coat. Under the same condition as adopted in Example 1, the same carrier core particles as used in Example 1 were treated with the thus prepared silicone composition, and characteristics of the resulting carrier was examined. As the results, a quantity of the initial electrification was 21 μc/g, and that after the 10 hours' forced deterioration was on a level of 18 μc/g.

EXAMPLE 3

The carrier core particles were processed under the same condition as in Example 2, except 0.3 pt. wt. of γ-aminopropyltrimethoxysilane (produced by Shin-Etsu Chemical Co., Ltd.: trade name, KBM-903) was used in place of iron octoate, and then examined for electrification quantity.

A quantity of the initial electrification was 37 μc/g, and that after the 10 hours' forced deterioration was on a level of 36 μc/g.

COMPARATIVE EXAMPLE 3

The carrier core particles were processed under the same condition as in Example 3, except the organohydrogenpolysiloxane used in Example 3 was not employed and the amount of solvent naphtha was changed to 141 pts. wt., and the thus obtained carrier powder was examined for electrification quantity similarly to Example 3. A quantity of the initial electrification was 36 μc/g, but it was changed to 23 μc/g after the 10 hours' forced deterioration. That is, a large difference was caused therebetween.

EXAMPLE 4

To 100 pts. wt. of the organopolysiloxane having the average composition formula, $(CH_3)_{1.15}X_{0.2}SiO_{1.325}$ (wherein X is methyldi(methylethylketoxime) silyl group), and a mean molecular weight of 3,900 were added 3 pts. wt. of the same organohydrogenpolysiloxane as used in Example 1, 77 pts. wt. of toluene and 232 pts. wt. of solvent naphtha to prepare a silicone composition for carrier coat.

The carrier core particles were processed under the same condition as in Example 1, and the carrier powder obtained was examined for electrification quantity.

A quantity of the initial electrification was 33 μc/g, and that after the 10 hours' forced deterioration was on a level of 32 μc/g.

COMPARATIVE EXAMPLE 4

The carrier core particles were processed in the same manner as in Example 4, except organohydrogenpolysiloxane used in Example 4 was not employed and the amount of solvent naphtha was changed to 223 pts. wt., and the thus obtained carrier powder was examined for electrification quantity. A quantity of the initial electrification was 33 μc/g, but it was decreased to 13 μc/g after the 10 hours' forced deterioration.

Therefore, this carrier powder was also unfit for developer in practical use.

EXAMPLE 5

To 100 pts. wt. of an organopolysiloxane having the average composition formula $(CH_3)_{1.2}(OCH_3)_{1.2}SiO_{0.8}$ and a mean molecular weight of about 480 were added 20 pts. wt. of the same organohydrogenpolysiloxane as used in Example 1, 180 pts. wt. of toluene and 180 pts. wt. of solvent naphtha. Thereto, 0.5 pt. wt. of dibutyltin diacetate was further added to prepare a silicone composition for carrier coat. Under the same condition as adopted in Example 1, the same carrier core particles as used in Example 1 were treated with the thus prepared silicone composition, and characteristics of the thus obtained carrier powder was examined. As the result, the initial electrification quantity was 35 μc/g, and that after the 10 hours' forced deterioration was on a level of 33 μc/g.

COMPARATIVE EXAMPLE 6

The carrier core particles were processed in the same manner as in Example 5, except the organohydrogenpolysiloxane used in Example 5 was not employed and the amount of toluene was changed to 120 pts. wt., and the thus obtained carrier powder was examined for electrification quantity. A quantity of the initial electrification was 31 μc/g, but it was sharply changed to 19 μc/g after the 10 hours' forced deterioration.

The results obtained in the examples and the comparative examples illustrated above clearly demonstrate the advantage of this invention.

What is claimed is:

1. A coating composition for an electrophotographic carrier, which comprises:

(A) 100 parts by weight of a compound represented by the general formula (1):

$$R_a X_b SiO_{(4-(a+b))/2} \qquad (1)$$

wherein R represents a substituted or unsubstituted hydrocarbon residue; X represents a hydroxyl group or a hydrolyzable group; "a" is a number in the range of $0.8 < a < 1.8$; and "b" is a number in the range of $0.01 < b \leq 3$;

(B) 0.05 to 50 parts by weight of an organohydrogenpolysiloxane having at least two hydrogen atoms bonded directly to a silicon atom; and (C) a curing catalyst for (A) and (B).

2. The coating composition of claim 1, in which R in the general formula (1) is selected from alkyl groups 1 to 4 carbon atoms, phenyl or vinyl groups.

3. The coating composition of claim 1, in which "a" is from 1.0 to 1.5.

4. The coating composition of claim 1, in which "b" is from 0.03 to 1.0.

5. The coating composition of claim 1, in which said organohydrogenpolysiloxane of the component (B) is represented by the following general formula (2), (3) or (4);

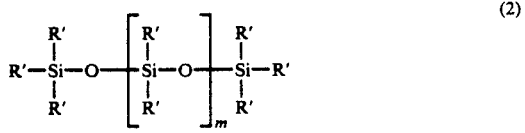

(2)

(3)

$$R'_c SiO_{(4-c)/2} \quad (4)$$

wherein the R's are the same or different and each is selected from a hydrogen atom, an alkyl group, an aryl group, a hydroxy group or a hydrolyzable group; with the proviso that at least two of the R's are hydrogen atoms; m is a positive integer of 3 or more; and c is a number from 1.5 to 2.0.

6. The coating composition of claim 1, wherein component (B) is present in an amount of 0.1 to 10 parts by weight per 100 parts by weight of component (A).

7. The coating composition of claim 1, wherein the curing catalyst is at least one compound selected from organotin compounds, organoiron compounds and amino-group-containing silane or siloxane compounds.

8. The coating composition of claim 1, wherein R in the general formula (1) is selected from alkyl of 1 to 4 carbon atoms, phenyl or vinyl; wherein "a" in the general formula (1) ranges from 1.0 to 1.5, wherein (b) in the general formula (1) ranges from 0.03 to 1.0, and wherein component (B) is present in an amount of 0.1 to 10 parts by weight per 100 parts by weight of component (A).

9. The coating composition of claim 8, wherein the curing catalyst is at least one compound selected from organotin compounds, organoiron compounds, or amino-group-containing silane or siloxane compounds.

* * * * *